(12) United States Patent
Kitamura

(10) Patent No.: US 11,021,015 B2
(45) Date of Patent: Jun. 1, 2021

(54) NON-PNEUMATIC TIRE

(71) Applicant: TOYO TIRE & RUBBER CO., LTD., Itami (JP)

(72) Inventor: Takashi Kitamura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 373 days.

(21) Appl. No.: 16/120,560

(22) Filed: Sep. 4, 2018

(65) Prior Publication Data

US 2019/0070904 A1    Mar. 7, 2019

(30) Foreign Application Priority Data

Sep. 7, 2017  (JP) .............................. JP2017-172032

(51) Int. Cl.
*B60C 7/14* (2006.01)
*B60C 7/10* (2006.01)

(52) U.S. Cl.
CPC ................ *B60C 7/14* (2013.01); *B60C 7/102* (2013.01); *B60C 2007/107* (2013.01); *B60C 2007/146* (2013.01)

(58) Field of Classification Search
CPC ..... B60C 7/14; B60C 7/102; B60C 2007/146; B60C 2007/107
See application file for complete search history.

(56) References Cited

U.S. PATENT DOCUMENTS 3,018,809 A * 1/1962 Bernard ................ B60C 15/028
                                                                          152/41
9,969,219 B2 * 5/2018 Iwamura ................ B60B 1/0261
(Continued)

FOREIGN PATENT DOCUMENTS

JP       2014172404 A  *  9/2014
JP       2014-218132 A    11/2014
(Continued)

OTHER PUBLICATIONS

Office Action dated Mar. 30, 2020, issued in counterpart CN Application No. 201810951968.0, with English Translation. (14pages).
(Continued)

*Primary Examiner* — Kip T Kotter
(74) *Attorney, Agent, or Firm* — Westerman, Hattori, Daniels & Adrian, LLP

(57) ABSTRACT

A non-pneumatic tire includes a support structure for supporting a load from a vehicle. The support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another, the plurality of connecting portions are configured such that elongated plate-like first connecting portions and elongated plate-like second connecting portions are arrayed along the tire circumferential direction, a plate thickness is smaller than a plate width, a plate thickness direction is oriented to the tire circumferential direction, and a plate thickness at a tire radial direction inner end coupled to the inner annular portion is larger than a plate thickness at a tire radial direction center portion.

7 Claims, 3 Drawing Sheets

(56) References Cited

U.S. PATENT DOCUMENTS

| | | | |
|---|---|---|---|
| 2014/0332127 A1 | 11/2014 | Iwamura | |
| 2016/0200144 A1 | 7/2016 | Iwamura et al. | |
| 2016/0236514 A1* | 8/2016 | Abe | B60C 7/14 |
| 2017/0341464 A1* | 11/2017 | Nishida | B60C 7/14 |
| 2018/0222254 A1 | 8/2018 | Abe | |
| 2019/0061428 A1* | 2/2019 | Iwamura | B60C 7/18 |
| 2020/0039293 A1* | 2/2020 | Cron | B60C 7/18 |

FOREIGN PATENT DOCUMENTS

| | | | |
|---|---|---|---|
| JP | 2015-39986 A | | 3/2015 |
| JP | 2015039987 A | * | 3/2015 |
| JP | 2016-130071 A | | 7/2016 |
| WO | 2017/061405 A1 | | 4/2017 |
| WO | 2017/117598 A1 | | 7/2017 |

OTHER PUBLICATIONS

Office Action dated Apr. 9, 2021, issued in counterpart JP Application No. 2017-172032, with English Translation. (7 pages).

* cited by examiner

NON-PNEUMATIC TIRE

BACKGROUND OF THE INVENTION

Field of the Invention

The present invention relates to a non-pneumatic tire provided with, as a tire structural member, a support structure for supporting a load from a vehicle. Preferably, the present invention relates to a non-pneumatic tire usable as a substitute for a pneumatic tire.

Description of the Related Art

As conventional non-pneumatic tires, for example, there are a solid tire, a spring tire, a cushion tire, and the like. These non-pneumatic tires do not have excellent performance of a pneumatic tire.

Patent Document 1 describes a non-pneumatic tire including: a cylindrical tread ring having a ground contact surface; a hub disposed radially inward of the tread ring and fixed to an axle; and spokes connecting the tread ring and the hub to each other. In Patent Document 1, a distribution of component lengths in a tire axial direction of tread joining portions over an entire circumference of the tire is adjusted. In the tread joining portions, the spokes join an inner circumferential surface of the tread ring. By this adjustment, vibration performance of the tire is improved while ensuring lightness and riding comfort.

Moreover, Patent Document 2 describes a non-pneumatic tire including: an inner annular portion; an outer annular portion provided concentrically on an outer side of the inner annular portion; and a plurality of connecting portions which connect the inner annular portion and the outer annular portion to each other and are provided independently of one another in a tire circumferential direction. The plurality of connecting portions are composed in such a manner that elongated plate-like first connecting portions and elongated plate-like second connecting portions are arrayed along the tire circumferential direction. The first connecting portions are extended from one side in a tire width direction of the inner annular portion to other side in a tire width direction of the outer annular portion. The second connecting portions are extended from other side in the tire width direction of the inner annular portion to one side in the tire width direction of the outer annular portion. In the first connecting portions and the second connecting portions, a plate thickness is smaller than a plate width, and a plate thickness direction is oriented to the tire circumferential direction. In this way, while improving durability, dispersion of a ground contact pressure during tire rolling is reduced.

Incidentally, in recent years, it has been studied to adopt a non-pneumatic tire for a small electric vehicle (EV). In adopting the non-pneumatic tire to the electric vehicle, it is essential to reduce a size of the tire due to a limited space in the vehicle in terms of design. Meanwhile, since it is difficult to reduce a weight of the electric vehicle due to a battery or the like, a burden to the tire from a load is increased. Therefore, it is desired to further improve durability of the tire.

PRIOR ART DOCUMENTS

Patent Documents

[Patent Document 1] JP-A-2014-218132
[Patent Document 2] JP-A-2015-39986

SUMMARY OF THE INVENTION

Accordingly, it is an object of the present invention to provide a non-pneumatic tire capable of improving the durability.

The above object can be achieved by the present invention as described below.

More specifically, a non-pneumatic tire according to the present invention is a non-pneumatic tire including a support structure for supporting a load from a vehicle, wherein the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another, the plurality of connecting portions are configured such that elongated plate-like first connecting portions and elongated plate-like second connecting portions are arrayed along the tire circumferential direction, the first connecting portions being extended from one side in a tire width direction of the inner annular portion to other side in a tire width direction of the outer annular portion, and the second connecting portions being extended from other side in the tire width direction of the inner annular portion to one side in the tire width direction of the outer annular portion, and in each of the first connecting portions and the second connecting portions, a plate thickness is smaller than a plate width, a plate thickness direction is oriented to the tire circumferential direction, and a plate thickness at a tire radial direction inner end coupled to the inner annular portion is larger than a plate thickness at a tire radial direction center portion.

In the present invention, in each of the first connecting portions and the second connecting portions, a plate thickness at a tire radial direction outer end coupled to the outer annular portion may be larger than the plate thickness at the tire radial direction center portion.

In the present invention, the plate thickness at tire radial direction outer end may be larger than the plate thickness at the tire radial direction inner end.

In the present invention, each of the first connecting portions and the second connecting portions may include a thick portion in which a plate thickness gradually increases from the tire radial direction inner end toward the tire radial direction center portion, a thin portion in which a plate thickness gradually decreases from the tire radial direction outer end toward the tire radial direction inner end through the tire radial direction center portion, and a tapered portion thinned from the thick portion to the thin portion.

A non-pneumatic tire according to the present invention includes: an inner annular portion; an outer annular portion concentrically provided on an outer side of the inner annular portion; and a plurality of connecting portions connecting the inner annular portion and the outer annular portion to each other. The plurality of connecting portions are configured such that a plurality of first connecting portions and a plurality of second connecting portions are arrayed in a tire circumferential direction. The first connecting portions are extended from one side in a tire width direction of the inner annular portion to other side in a tire width direction of the outer annular portion, and the second connecting portions are extended from other side in the tire width direction of the inner annular portion to one side in the tire width direction of the outer annular portion. The first connecting portions and the second connecting portions have an elongated plate shape in which a plate thickness is smaller than a plate width, and a plate thickness direction is oriented to the tire circumferential direction. As a result, even if the plate thickness is thinned, the connecting portions can obtain desired rigidity by setting the plate width to be wide, and therefore, the durability can be improved. Moreover, in each of the first connecting portions and the second connecting portions, the plate thickness at the tire radial direction inner end coupled to the inner annular portion is larger than the plate thickness at the tire radial direction center portion. Accordingly, bending in a root portion on an inner annular portion side is suppressed. Accordingly, even when a large load is applied to the tire, the tire radial direction center portion can be prevented from coming into contact with the tire radial direction center portion of the adjacent first connecting portion or the second connecting portion, and the durability can be further improved.

DETAILED DESCRIPTION OF THE PREFERRED EMBODIMENTS

Figure 1:
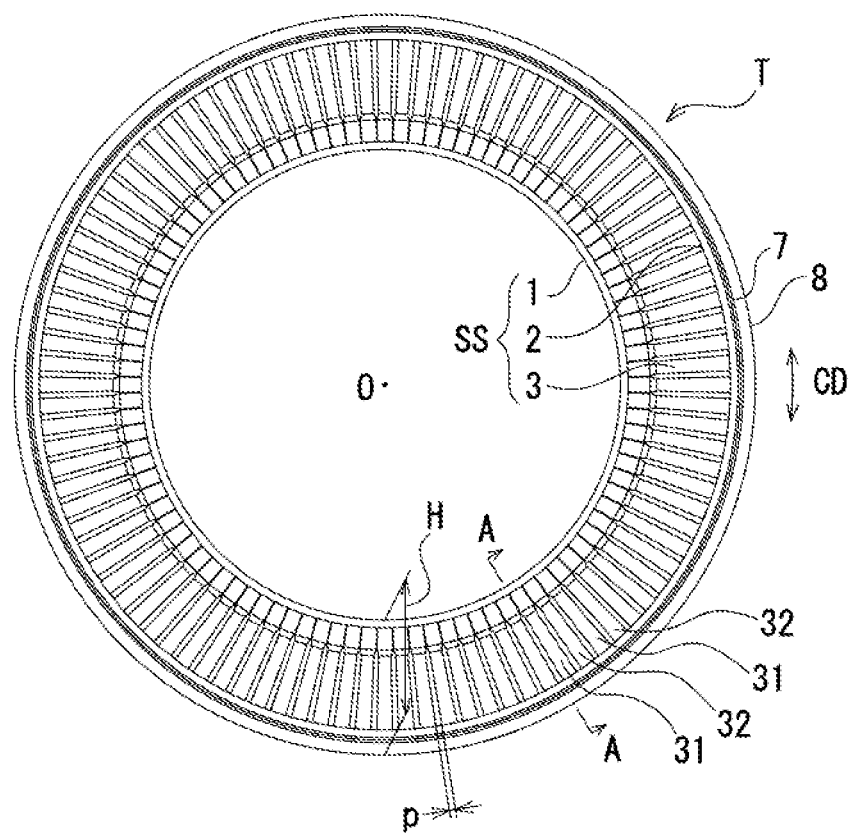
FIG. 1 is a front view showing an example of a non-pneumatic tire of the present invention.
Figure 2A:
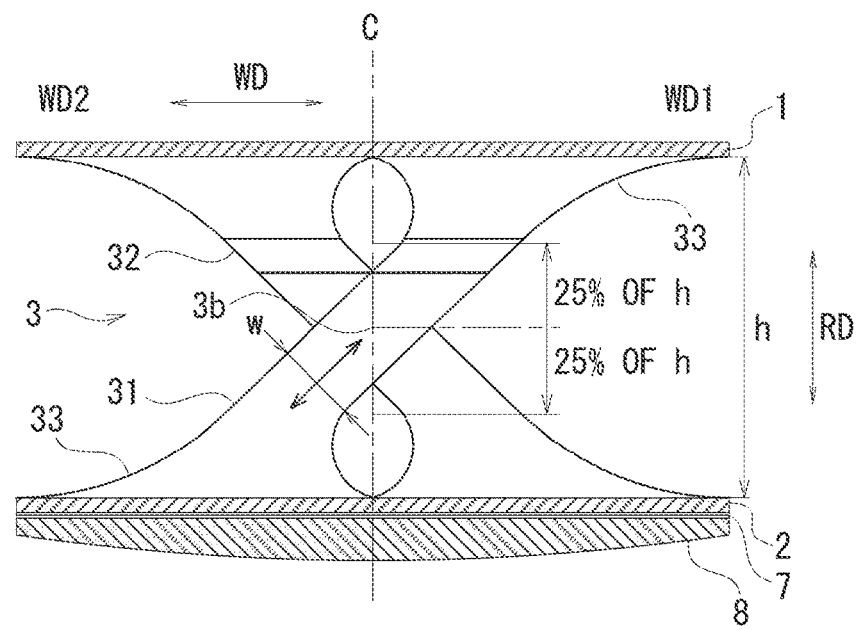
FIG. 2A is a cross-sectional view taken along a line A-A of the non-pneumatic tire of FIG. 1.
Figure 2B:
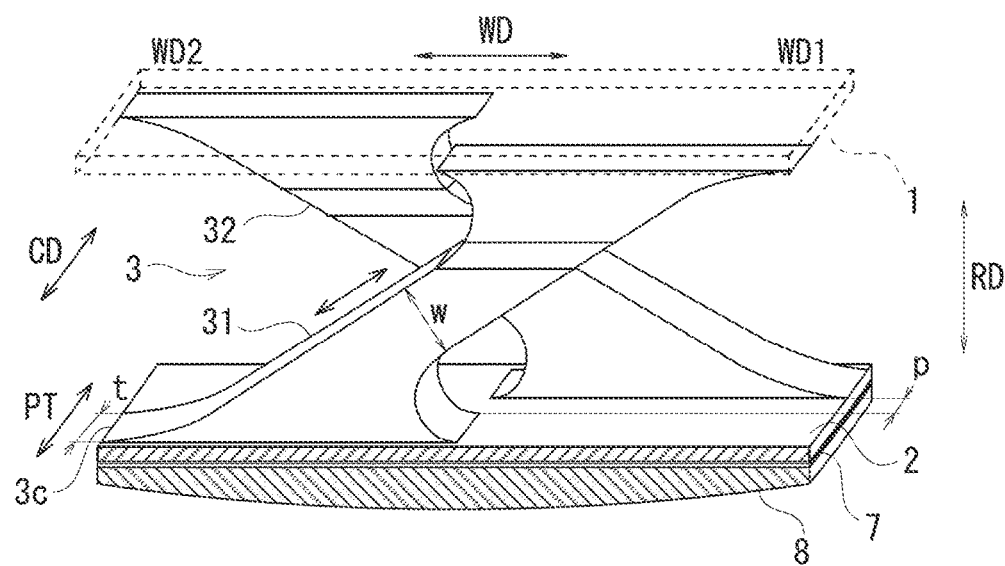
FIG. 2B is a perspective view showing a part of the non-pneumatic tire of FIG. 1.
Figure 3:
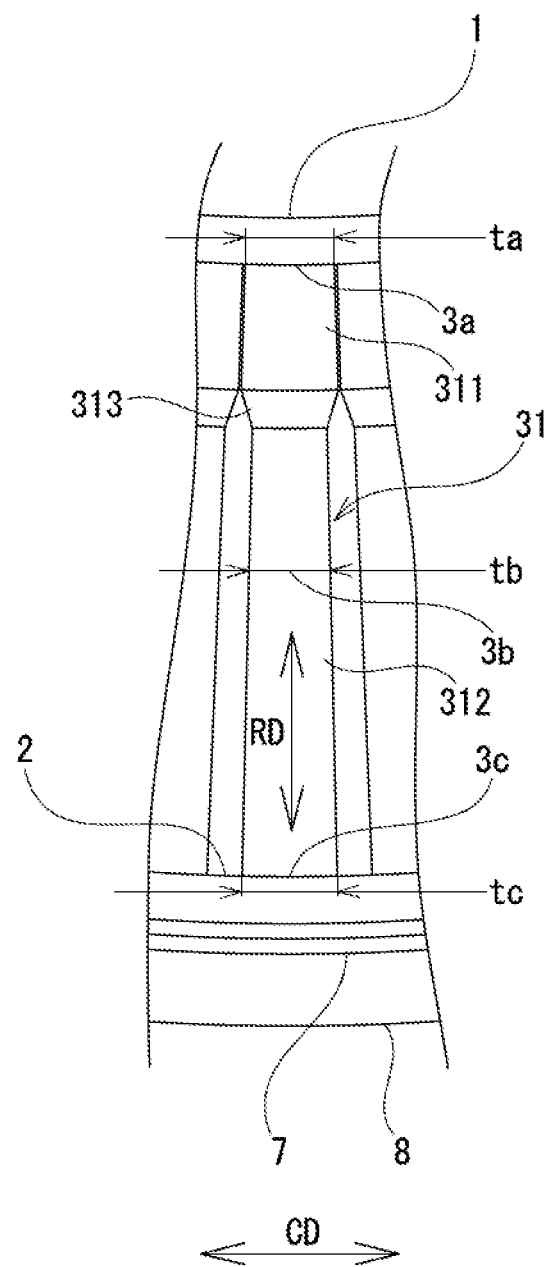
FIG. 3 is a partially enlarged view of the non-pneumatic tire of FIG. 1.

Hereinafter, embodiments of the present invention will be described with reference to the drawings. First, a configuration of a non-pneumatic tire T of the present invention will be described. FIG. 1 is a front view showing an example of the non-pneumatic tire T. FIG. 2A is a cross-sectional view taken along a line A-A of FIG. 1, and FIG. 2B is a perspective view showing a part of the non-pneumatic tire. FIG. 3 is an enlarged view of a part of FIG. 1. Here, reference symbol O denotes an axis, and reference symbol H denotes a cross-sectional height of the tire.

The non-pneumatic tire T is provided with a support structure SS for supporting a load from a vehicle. The non-pneumatic tire T of the present invention just needs to be provided with such a support structure SS as described above. A member corresponding to the tread, a reinforcing layer, members for accommodation to an axle and a rim may be provided on an outer side (outer circumference side) and inner side (inner circumference side) of the support structure SS.

As shown in the front view of FIG. 1, in the non-pneumatic tire T of this embodiment the support structure SS includes: an inner annular portion 1; an outer annular portion 2 provided concentrically on an outer side of the inner annular portion 1; and a plurality of connecting portions 3 which connect the inner annular portion 1 and the outer annular portion 2 to each other and are provided independently of one another in a tire circumferential direction CD.

From a viewpoint of improving uniformity, it is preferable that the inner annular portion 1 have a cylindrical shape with a constant thickness. Moreover, on an inner circumferential surface of the inner annular portion 1, it is preferable to provide irregularities and the like for maintaining fitting property in order to mount, the non-pneumatic tire T to the axle and the rim.

The thickness of the inner annular portion 1 is preferably 2 to 10% of the cross-sectional height H of the tire, more preferably 3 to 9% thereof from a viewpoint of achieving weight reduction and improvement of durability while sufficiently transmitting force to the connecting portions 3.

An inner diameter of the inner annular portion 1 is appropriately determined according to dimensions of the rim and the axle on which the non-pneumatic tire T is to be mounted, and the like. However, when substitution for a general pneumatic tire is assumed, the inner diameter is preferably 250 to 500 mm, more preferably 320 to 440 mm.

A width of the inner annular portion 1 in a tire width direction is appropriately determined depending on a purpose, a length of the axle, and the like. However, when the substitution for a general pneumatic tire is assumed, the width is preferably 100 to 300 mm, more preferably 120 to 250 mm.

A tensile modulus of the inner annular portion 1 is preferably 5 to 180,000 MPa, more preferably 7 to 50,000 MPa from a viewpoint of achieving the weight reduction, the improvement of the durability and mounting easiness while sufficiently transmitting a force to the connecting portions 3. The tensile modulus in the present invention is a value calculated from a tensile stress at 10% elongation after conducting a tensile test according to JIS K7312.

The support structure SS in the present invention is formed of an elastic material. From a viewpoint of enabling integral molding at the time of manufacturing the support structure SS, it is preferable that the inner annular portion 1, the outer annular portion 2, and the connecting portion 3 be basically made of the same material except a reinforcing structure.

The elastic material in the present invention refers to a material in which the tensile modulus calculated from the tensile stress at 10% elongation after conducting the tensile test according to JIS K7312 is 100 MPa or less. In the elastic material of the present invention, the tensile modulus is preferably 5 to 100 MPa, more preferably 7 to 50 MPa from a viewpoint of imparting appropriate rigidity while obtaining sufficient durability. Examples of the elastic material used as a base material include thermoplastic elastomer, crosslinked rubber, and other resins.

Examples of the thermoplastic elastomer include polyester elastomer, polyolefin elastomer, polyamide elastomer, polystyrene elastomer, polyvinyl chloride elastomer, and polyurethane elastomer. Examples of a rubber material that composes the crosslinked rubber material include not only natural rubber but also synthetic rubber such as styrene butadiene rubber (SBR), butadiene rubber (BR), isoprene rubber (IIR), nitrile rubber (NBR), hydrogenated nitrile rubber (hydrogenated NBR), chloroprene rubber (CR), ethylene propylene rubber (EPDM), fluororubber, silicone rubber, acrylic rubber, and urethane rubber. Two or more of these rubber materials may be used in combination according to needs.

Examples of other resins include thermoplastic resin and thermosetting resin. Examples of the thermoplastic resin include polyethylene resin, polystyrene resin, and polyvinyl chloride resin. Examples of the thermosetting resin include epoxy resin, phenol resin, polyurethane resin, silicone resin, polyimide resin, and melamine resin.

Among the above elastic materials, the polyurethane resin is preferably used from viewpoints of moldability and processability and cost. As the elastic material, a foamed material may be used, and those obtained by foaming the above thermoplastic elastomer, crosslinked rubber, and other resins are usable.

In the support structure SS integrally molded with the elastic material, it is preferable that the inner annular portion 1, the outer annular portion 2, and the connecting portions 3 be reinforced by reinforcing fiber.

Examples of the reinforcing fiber include reinforcing fibers such as long fiber, short fiber, woven fabric, and nonwoven fabric. However, as a mode of using the long fiber, it is preferable to use net-like fiber aggregate composed of pieces of fiber, which are arrayed in the tire width direction, and of pieces of fiber, which are arrayed in the tire circumferential direction.

Examples of the reinforcing fiber include a rayon cord, a polyamide cord such as nylon-6,6, a polyester cord such as polyethylene terephthalate, an aramid cord, a glass fiber cord, a carbon fiber, and a steel cord.

In the present invention, in addition to the reinforcement using the reinforcing fiber, it is possible to perform reinforcement using a granular filler or reinforcement using a metal ring or the like. Examples of the granular filler include carbon black, silica, ceramics such as alumina, and other inorganic fillers.

From the viewpoint of improving the uniformity, it is preferable that the outer annular portion 2 have a cylindrical shape with a constant thickness. The thickness of the outer annular portion 2 is preferably 2 to 20% of the cross-sectional height H of the tire, more preferably 10 to 15% thereof from the viewpoint of achieving the weight reduction and the improvement of the durability while sufficiently transmitting force from the connecting portions 3.

An inner diameter of the outer annular portion 2 is appropriately determined depending on a purpose and the like. However, when the substitution for a general pneumatic tire is considered, the inner diameter is preferably 420 to 750 mm, more preferably 470 to 680 mm.

A width of the outer annular portion 2 in the tire width direction is appropriately determined depending on the purpose and the like. However, when the substitution for a general pneumatic tire is considered, the width is preferably 100 to 300 mm, more preferably 120 to 250 mm.

When a reinforcing layer 7 is provided on an outer circumference of the outer annular portion 2 as shown in FIG. 1, the tensile modulus of the outer annular portion 2 can be set to the same degree as the inner annular portion 1. When such a reinforcing layer 7 is not provided, the tensile modulus of the outer annular portion 2 is preferably 5 to 180,000 MPa, more preferably 7 to 50,000 MPa from a viewpoint of achieving the weight reduction and the improvement of the durability while sufficiently transmitting the force from the connecting portions 3.

When increasing the tensile modulus of the outer annular portion 2, a fiber-reinforced material in which an elastic material is reinforced by fiber and the like is preferably used. By reinforcing the outer annular portion 2 by reinforcing fiber, the outer annular portion 2 is also sufficiently adhered to a belt layer and the like.

The connecting portions 3 connect the inner annular portion 1 and the outer annular portion 2 to each other. The connecting portions 3 are plural and provided independently of one another in the tire circumferential direction CD at appropriate intervals between the inner annular portion 1 and the outer annular portion 2.

The plural connecting portions 3 are configured such that first connecting portions 31 and second connecting portions 32 are arrayed along the tire circumferential direction CD. In this case, it is preferable that the first connecting portions 31 and the second connecting portions 32 are arrayed alternately with each other along the tire circumferential direction CD. This makes it possible to further reduce the dispersion of the ground contact pressure during the tire rolling.

From the viewpoint of improving the uniformity, it is preferable that a pitch p in the tire circumferential direction CD between each of the first connecting portions 31 and each of the second connecting portions 32 be set constant. The pitch p is preferably 0 to 10 mm, more preferably 0 to 5 mm. When the pitch p is larger than 10 mm, the ground contact pressure becomes uneven, which may cause noise to increase.

Each of the first connecting portions 31 is extended from one side WD1 in the tire width direction of the inner annular portion 1 toward other side WD2 in the tire width direction of the outer annular portion 2. Meanwhile, each of the second connecting portions 32 is extended from the other side WD2 in the tire width direction of the inner annular portion 1 toward one side WD1 in the tire width direction of the outer annular portion 2. That is, the first connecting portion 31 and the second connecting portion 32, which are adjacent to each other, are disposed in a substantially X shape when viewed in the tire circumferential direction CD.

The first connecting portion 31 and the second connecting portion 32 when viewed in the tire circumferential direction CD are preferably symmetric to each other with respect to a tire equatorial plane C as shown in FIG. 2A. Therefore, hereinafter, the first connecting portion 31 will mainly be described.

The first connecting portion 31 has an elongated plate-like shape extending from the inner annular portion 1 to the outer annular portion 2. In the first connecting portion 31, a plate thickness t is smaller than a plate width w, and a plate thickness direction PT is oriented to the tire circumferential direction CD. That is, the first connecting portion 31 has a plate shape extending in a tire radial direction RD and in a tire width direction WD. The first connecting portion 31 and the second connecting portion 32 are formed into such an elongated plate shape. In this way, even if the plate thickness t is reduced, the first, connecting portion 31 and the second connecting portion 32 can obtain desired rigidity by setting the plate width w to be wide. Therefore, the durability can be improved. Moreover, the number of first connecting portions 31 and the number of second connecting portions 32 are increased while thinning the plate thickness t. In this way, gaps between the connecting portions adjacent to one another in the tire circumferential direction CD can be reduced while maintaining the rigidity of the entire tire. Therefore, the dispersion of the ground contact pressure during the tire rolling can be reduced.

As shown in FIG. 3, the first connecting portion 31 is coupled to the inner annular portion 1 at a tire radial direction inner end 3a, and is coupled to the outer annular portion 2 at a tire radial direction outer end 3c. A center of the first connecting portion 31 in the tire radial direction RD is defined as a tire radial direction center portion 3b.

The plate thickness t of the first connecting portion 31 varies along the tire radial direction RD. Specifically, the first connecting portion 31 includes: a thick portion 311 in which a plate thickness gradually increases from the tire radial direction inner end 3a toward the tire radial direction center portion 3b; a thin portion 312 in which a plate thickness gradually decreases from the tire radial direction outer end 3c toward the tire radial direction inner end 3a through the tire radial direction center portion 3b; and a tapered portion 313 thinned from the thick portion 311 to the thin portion 312. The thick portion 311 and the tapered portion 313 are located inward of the tire radial direction center portion 3b in the tire radial direction. Both side surfaces of the thick portion 311 in the tire circumferential direction CD extend radially along the tire radial direction RD, whereby the plate thickness of the thick portion 311 gradually increases toward the outside in the tire radial direction. Moreover, both side surfaces of the thin portion 312 in the tire circumferential direction CD extend radially along the tire radial direction RD, whereby the plate thickness of the thin portion 312 gradually decreases toward the inside in the tire radial direction.

In the first connecting portion 31, a plate thickness ta at the tire radial direction inner end 3a is larger than a plate thickness tb at the tire radial direction center portion 3b. As a result, bending of the first connecting portion 31 in a vicinity of the tire radial direction inner end 3a, that is, in a root portion on the inner annular portion 1 side is suppressed. Accordingly, even when a large load is applied to the tire, the tire radial direction center portion 3b can be prevented from largely bending and coming into contact with the tire radial direction center portion of the adjacent second connecting portion 32, and the durability can be further improved. The plate thickness ta is preferably 100% or more of the plate thickness tb, more preferably 110% or more.

Moreover, the plate thickness tc at the tire radial direction outer end 3c is larger than the plate thickness tb at the tire radial direction center portion 3b. As a result, bending of the first connecting portion 31 in a vicinity of the tire radial direction outer end 3c, that is, in a root portion on the outer annular portion 2 side is suppressed. Accordingly, even when a large load is applied to the tire, the tire radial direction center portion 3b can be prevented from largely bending and coming into contact with the tire radial direction center portion of the adjacent second connecting portion 32, and the durability can be further improved. The plate thickness tc is preferably 100% or more of the plate thickness tb, more preferably 110% or more.

Moreover, the plate thickness tc at the tire radial direction outer end 3c is larger than the plate thickness ta at the tire radial direction inner end 3a. That is, it is preferable that the plate thickness be set as: the plate thickness tc>the plate thickness ta>the plate thickness tb. The plate thickness tc is preferably 100% or more of the plate thickness ta, more preferably 110% or more.

The plate thickness t is preferably from 8 to 30 mm, more preferably from 10 to 25 mm from a viewpoint of achieving weight reduction and durability improvement while sufficiently transmitting forces from the inner annular portion 1 and the outer annular portion 2.

The plate width w is preferably from 5 to 25 mm, more preferably from 10 to 20 mm from the viewpoint of achieving the weight reduction and the durability improvement while sufficiently transmitting the forces from the inner annular portion 1 and the outer annular portion 2. Moreover, the plate width w is preferably 110% or more of the plate thickness t, more preferably 115% or more from a viewpoint of reducing dispersion of a ground contact pressure while improving the durability.

Preferably, the first connecting portion 31 has reinforcing portions 33, in which a plate width gradually increases toward the inner annular portion 1 or the outer annular portion 2, in a vicinity of a joint portion with the inner annular portion 1 and in a vicinity of a joint portion with the outer annular portion 2. In this way, the durability of the first connecting portion 31 can be further improved. Preferably, a range in which each of the reinforcing portions 33 is provided is outside a range of ±25% of h from the tire radial direction center portion 3b of the first connecting portion 31. Moreover, the reinforcing portion 33 is provided in the thick portion 311 of the first connecting portion 31.

The number of the connecting portions 3 is preferably 80 to 300, more preferably 100 to 200 from a viewpoint of achieving the weight reduction, improvement of power transmission and the durability while sufficiently supporting the load from the vehicle. FIG. 1 shows an example in which 50 pieces of the first connecting portions 31 and 50 pieces of the second connecting portions 32 are provided.

A tensile modulus of the connecting portion 3 is preferably 5 to 180,000 MPa, more preferably 7 to 50,000 MPa from a viewpoint of achieving the weight reduction, the improvement of the durability and improvement of lateral rigidity while sufficiently transmitting the forces from the inner annular portion 1 and the outer annular portion 2. When increasing the tensile modulus of the connecting portion 3, a fiber-reinforced material in which an elastic material is reinforced by fiber and the like is preferably used.

In this embodiment, as shown in FIG. 1, there is shown an example in which the reinforcing layer 7 for making reinforcement against bending deformation of the outer annular portion 2 of the support structure SS is provided outside the outer annular portion 2. Moreover, in this embodiment, as shown in FIG. 1, an example in which a tread 8 is provided further outside the reinforcing layer 7 is shown. As the reinforcing layer 7 and the tread 3, it is possible to provide similar ones to a belt layer and a tread of the conventional pneumatic tire. The tread 8 may be made of resin. Further, as the tread pattern, it is possible to provide a similar pattern to the conventional pneumatic tire.

In the present invention, it is preferable to further dispose a width direction reinforcing layer for increasing the rigidity in the tire width direction between the tire radial direction outer end of the connecting portion 3 and the tread 8. This suppresses buckling at a tire width direction center portion of the outer annular portion 2 and makes it possible to further improve the durability of the connecting portions 3. The width direction reinforcing layer is buried in the outer annular portion 2 or disposed outside the outer annular portion 2. Examples of the width direction reinforcing layer include a stuff in which steel cords or cords made of fiber reinforced plastics such as carbon fiber reinforced plastics (CFRP) and glass fiber reinforced plastics (GFRP) are arrayed substantially parallel to the tire width direction, a cylindrical metal ring, and a cylindrical high-modulus resin ring.

Other Embodiment

In the above embodiment, the plate thickness of the thick portion 311 of the first connecting portion 31 gradually increases from the tire radial direction inner end 3a toward the tire radial direction center portion 3b, but the plate thickness is not limited to this. For example, the plate thickness of the thick portion 311 of each of the first connecting portion 31 and the second connecting portion 32 may be constant in the tire radial direction RD.

EXAMPLE

Example and the like which specifically show the configuration and effect of the present invention will be described below. The durability in each of Example and the like was measured as follows by a drum testing machine in accordance with FMVSS 109. A test speed was set constant at 80 km/h, and a distance traveled until a failure occurred was measured while applying a load divided into four gradually increasing steps. The distance traveled is indicated by an index when a distance traveled in Comparative example is 100, and a larger value is better.

Example

The non-pneumatic tire shown in FIGS. 1 to 3 was taken as Example. The plate thickness at the tire radial direction inner end of each of the first connecting portion and the second connecting portion was set at 10.6 mm.

Comparative Example

A first connecting portion and a second connecting portion were formed so that a plate thickness of each gradually reduced from a tire radial direction outer end to a tire radial direction inner end through a tire radial direction center portion (refer to FIG. 3 of Patent Document 2). Except for the above, the same configuration as in Example was adopted. That is, in Comparative example, each of the first connecting portion and the second connecting portion is not provided with the thick portion and the tapered portion, in which the thin portion extends from the tire radial direction outer end to the tire radial direction inner end. The plate thickness at the tire radial direction inner end of each of the first connecting portion and the second connecting portion was set at 9.2 mm.

As a result of the measurement, distance traveled in Example was 150, and the durability was improved as compared with Comparative example.

What is claimed is:

1. A non-pneumatic tire comprising a support structure for supporting a load from a vehicle,
    wherein the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another,
    the plurality of connecting portions are configured such that elongated plate-like first connecting portions and elongated plate-like second connecting portions are arrayed along the tire circumferential direction, the first connecting portions being extended from one side in a tire width direction of the inner annular portion to other side in a tire width direction of the outer annular portion, and the second connecting portions being extended from the other side in the tire width direction of the inner annular portion to the one side in the tire width direction of the outer annular portion, and
    in each of the first connecting portions and the second connecting portions, a plate thickness is smaller than a plate width, a plate thickness direction is oriented to the tire circumferential direction, and a plate thickness at a tire radial direction inner end coupled to the inner annular portion is larger than a plate thickness at a tire radial direction center portion,
    wherein each of the first connecting portions and the second connecting portions include; a thick portion having a plate thickness which is constant from the tire radial direction inner end toward the tire radial direction center portion, the plate thickness of the thick portion is larger than the plate thickness at the tire radial direction center portion.

2. The non-pneumatic tire according to claim 1, wherein, in each of the first connecting portions and the second connecting portions, a plate thickness at a tire radial direction outer end coupled to the outer annular portion is larger than the plate thickness at the tire radial direction center portion.

3. The non-pneumatic tire according to claim 2, wherein the plate thickness at tire radial direction outer end is larger than the plate thickness at the tire radial direction inner end.

4. A non-pneumatic tire comprising a support structure for supporting a load from a vehicle,
    wherein the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another,
    the plurality of connecting portions are configured such that elongated plate-like first connecting portions and elongated plate-like second connecting portions are arrayed along the tire circumferential direction, the first connecting portions being extended from one side in a tire width direction of the inner annular portion to other side in a tire width direction of the outer annular portion, and the second connecting portions being extended from the other side in the tire width direction of the inner annular portion to the one side in the tire width direction of the outer annular portion, and
    in each of the first connecting portions and the second connecting portions, a plate thickness is smaller than a plate width, a plate thickness direction is oriented to the tire circumferential direction, and a plate thickness at a tire radial direction inner end coupled to the inner annular portion is larger than a plate thickness at a tire radial direction center portion,
    wherein, in each of the first connecting portions and the second connecting portions, a plate thickness at a tire radial direction outer end coupled to the outer annular portion is larger than the plate thickness at the tire radial direction center portion,
    wherein each of the first connecting portions and the second connecting portions includes; a thick portion in which a plate thickness gradually increases from the tire radial direction inner end toward the tire radial direction center portion; a thin portion in which a plate thickness gradually decreases from the tire radial direction outer end toward the tire radial direction inner end through the tire radial direction center portion; and a tapered portion thinned from the thick portion to the thin portion.

5. The non-pneumatic tire according to claim 4, wherein both side surfaces of the thick portion in the tire circumferential direction extend radially along the tire radial direction.

6. The non-pneumatic tire according to claim 4, wherein both side surfaces of the thin portion in the tire circumferential direction extend radially along the tire radial direction.

7. The non-pneumatic tire according to claim 4, wherein the plate thickness at tire radial direction outer end is larger than the plate thickness at the tire radial direction inner end.

* * * * *